United States Patent
Bennett et al.

(10) Patent No.: US 8,994,819 B2
(45) Date of Patent: Mar. 31, 2015

(54) INTEGRATED OPTICAL DETECTION SYSTEM

(75) Inventors: Robert Jeffrey Bennett, Allen, TX (US); Frederic W. Kingdon, Fairview, TX (US)

(73) Assignee: Raytheon Company, Waltham, MA (US)

( * ) Notice: Subject to any disclaimer, the term of this patent is extended or adjusted under 35 U.S.C. 154(b) by 653 days.

(21) Appl. No.: 13/021,181

(22) Filed: Feb. 4, 2011

(65) Prior Publication Data

US 2012/0200700 A1    Aug. 9, 2012

(51) Int. Cl.
| H04N 7/18 | (2006.01) |
| G01S 17/02 | (2006.01) |
| G01S 17/42 | (2006.01) |

(52) U.S. Cl.
CPC ............. G01S 17/026 (2013.01); G01S 17/42 (2013.01)
USPC ........................................................ 348/143

(58) Field of Classification Search
CPC ................................ G01S 17/026; G01S 17/42
USPC ............. 356/139.05, 622; 348/143, 160–164, 348/169–172; 235/454

See application file for complete search history.

(56) References Cited

U.S. PATENT DOCUMENTS

| 6,493,123 | B1 * | 12/2002 | Mansell et al. | 398/169 |
| 6,603,134 | B1 | 8/2003 | Wild et al. | |
| 7,148,974 | B1 * | 12/2006 | Schmitt et al. | 356/622 |
| 8,203,702 | B1 * | 6/2012 | Kane et al. | 356/139.05 |
| 8,464,433 | B1 * | 6/2013 | Cardarelli | 33/318 |
| 2006/0060651 | A1 * | 3/2006 | McIntyre et al. | 235/454 |
| 2009/0237668 | A1 * | 9/2009 | Reyes et al. | 356/445 |

* cited by examiner

*Primary Examiner* — Tung Vo
*Assistant Examiner* — Rowina Cattungal
(74) *Attorney, Agent, or Firm* — Lando & Anastasi, LLP

(57) ABSTRACT

An optical detection system integrated within an electro-optical sighting and/or scanning system and a method to perform a rapid wide area search are disclosed. In one example, an integrated optics detection subsystem is configured with one-the-move processing methods to perform the optics defeat functions to during a wide area search or sector scan performed by the host electro-optical sighting system.

16 Claims, 4 Drawing Sheets

INTEGRATED OPTICAL DETECTION SYSTEM

BACKGROUND

Optical detection and defeat systems are used to detect the presence of an entity (for example, an enemy in military applications) employing surveillance equipment and to neutralize this surveillance capability. Some systems use the principle of retro-reflection to detect optical/electro-optical (O/EO) devices, for example, binoculars, telescopes, video recorders, and/or cameras. An O/EO device generally includes an aperture to allow light to enter the device, and optics (e.g., one or more lenses) to magnify the image and focus the light on a transducer or collimate it for viewing by a human. The light forms an image at the focal plane of the O/EO device (either a human eye's retina or the electro-optical transducer). Such O/EO devices act as retro-reflectors, namely reflectors wherein incident rays and reflected rays are parallel for any angle of incidence within the field of view of the device. A characteristic of a retro-reflector is that the reflected energy forms a very narrow, substantially collimated, beam, referred to as the retro-reflected beam that is reflected back in the direction of the incident light beam. This phenomenon is called retro-reflection. Optical detection systems scan an area for a target using an optical beam, such as a laser beam or other mono-chromatic light source, and detect the target by detecting the retro-reflected beam from the target. An example of such a system is discussed in U.S. Patent Publication No. 2009/0237668 titled "DETECTING A TARGET USING AN OPTICAL AUGMENTATION SENSOR."

SUMMARY OF INVENTION

Aspects and embodiments are directed to an optical detection system that is integrated within an electro-optical sighting and/or searching system. In particular, according to one embodiment, an integrated optics detection subsystem is configured to allow the optics detection functions to be performed during a wide area search or sector scan performed by the host electro-optical sighting system, as discussed further below. Integration of the optics detection capability within a host sighting system may improve system layout on the host platform, and allow for reduced overall size, weight, and power requirements as well as cost through consolidation of capabilities within common components.

One embodiment of an electro-optical sighting system includes an integrated optics detection (OD) sub-system comprising an optical module, a video processor and a controller. The optical module includes an interrogator source configured to generate and emit an interrogation beam, an OD receiver configured to image a reflection of the interrogation beam, and a movable backscan mirror optically coupled to the OD receiver and configured to direct the reflection to the OD receiver. The system also includes a video processor coupled to the OD receiver and configured to receive and process image data from the OD receiver to determine whether the image data contains a retro-reflection of the interrogation beam indicating presence of an optical system in the target area. The system further includes a controller coupled to the optical module and configured to pan the optical module to sweep the interrogation beam across the target area, and to control the movable backscan mirror to periodically hold an image of the reflection stationary so as to collect data by the receiver. With this arrangement, advantages include any of improved system layout, improved deconfliction with other systems, reduced size, weight, power consumption, system cost, and complexity, improved search time and improved system performance.

One embodiment of an electro-optical sighting system includes an integrated optics detection (OD) sub-system comprising an optical module, a video processor, a controller coupled to the optical module and a shared line of sight assembly. The optical module includes a source configured to generate and emit a scanning beam, an interrogator source configured to generate and emit an interrogation beam, a receiver configured to image a reflection of the scanning beam, and an OD receiver configured to image a reflection of the interrogation beam. The system also includes a video processor coupled to the receiver and the OD receiver and configured to receive and process image data from the OD receiver to determine whether the image data contains a retro-reflection of the interrogation beam indicating presence of an optical system in the target area. The controller and the shared line of sight assembly are configured to measure a range to an area of interest and to control a gimbal configured to move the electro-optical sighting system to pan the optical module across the target area. With this arrangement, advantages include any of improved system layout, improved deconfliction with other systems, reduced size, weight, power consumption, system cost, and complexity, improved search time and improved system performance.

One embodiment of an electro-optical sighting system includes an integrated optics detection (OD) sub-system comprising an optical module, a video processor and a controller. The optical module includes an OD interrogator source configured to generate and emit an interrogation beam. The optical module further includes an OD receiver configured to image a reflection of the interrogation beam, and a movable backscan mirror optically coupled to the optical module and configured to direct the OD interrogator beam to illuminate the search area and reflections of the interrogator beam to the OD receiver. The system also includes a video processor coupled to the OD receiver and configured to receive and process image data from the OD receiver to determine whether the image data contains a retro-reflection of the interrogation beam indicating presence of an optical system in the target area. The system further includes a controller coupled to the optical module and configured to pan the optical module to sweep a field of view of the OD interrogator source across the target area. The controller is also configured to control the movable backscan mirror to periodically hold the OD interrogator beam on a fixed location within the search area and hold an image of the reflection stationary on the receiver. With this arrangement, advantages include any of improved system layout, improved deconfliction with other systems, reduced size, weight, power consumption, system cost, and complexity, improved search time and improved system performance.

One embodiment of an electro-optical sighting system includes an integrated optics detection (OD) sub-system comprising an optical module, a video processor and a controller. The optical module includes an interrogator laser configured to generate and emit an interrogation beam, a multi-purpose imager subsystem including an OD receiver configured to image a reflection of the interrogation beam, and a movable backscan mirror optically coupled to the OD receiver and configured to direct the reflection to the OD receiver. The system also includes a video processor coupled to the OD receiver and configured to receive and process image data from the OD receiver to determine whether the image data contains a retro-reflection of the interrogation beam indicating presence of an optical system in the target area. The system further includes a controller coupled to the optical module and configured to pan the optical module to sweep a field of view of interrogation beam across the target area, the controller further configured to control the movable backscan mirror to periodically hold an image of the reflection stationary to be imaged by the receiver. With this arrangement, advantages include any of improved system layout, improved deconfliction with other systems, reduced size, weight, power consumption, system cost, and complexity, improved search time and improved system performance.

One embodiment of an electro-optical sighting system includes an integrated optics detection (OD) sub-system comprising an optical module, a video processor and a controller. The optical module includes a multi-function laser configured to generate and emit a scanning beam to search the target area, and an OD interrogator laser configured to generate and emit an interrogation beam. The optical module further includes a multi-purpose imager subsystem including an OD receiver configured to image a reflection of the interrogation beam, and a movable backscan mirror optically coupled to the OD receiver and configured to direct the reflection to the OD receiver. The system also includes a video processor coupled to the OD receiver and configured to receive and process image data from the OD receiver to determine whether the image data contains a retro-reflection of the interrogation beam indicating presence of an optical system in the target area. The system further includes a controller coupled to the optical module and configured to pan the optical module to sweep a field of view of the multi-function laser across the target area. The controller is also configured to control the movable backscan mirror to periodically hold an image of the reflection stationary to be imaged by the receiver. With this arrangement, advantages include any of improved system layout, improved deconfliction with other systems, reduced size, weight, power consumption, system cost, and complexity, improved search time and improved system performance.

According to aspects of the system, the electro-optical sighting system also includes a movable backscan mirror optically coupled the OD receiver and configured to direct the reflection of the interrogation beam to the OD receiver. The movable backscan mirror can also be coupled to the receiver to direct the reflection of the scanning bean to the receiver.

According to aspects of the system, the optical module can also include afocal optics optically coupled to the backscan mirror and configured to receive and direct the reflection of the interrogation beam to the backscan mirror. The optical module can also be configured to receive and direct the reflection of the scanning beam to the backscan mirror.

According to aspects of the system, the OD interrogator laser is coupled to the backscan mirror and the backscan mirror is further configured to direct the interrogation beam toward the target area.

According to aspects of the system, the OD receiver includes a camera. According to aspects of the system, the camera is an infrared camera.

According to aspects of the system, the OD interrogator includes an infrared diode laser.

According to aspects of the system, the optical module further comprises at least one additional source and at least one additional receiver coupled to the backscan mirror, and the electro-optical sighting system includes a shared line of sight assembly configured to measure a range to an area of interest and to control a gimbal configured to move the electro-optical sighting system.

According to aspects of the system, the optical module further includes a multi-function laser configured to generate and emit a scanning beam to search the target area, wherein the optical module is configured to perform a wide area search of the target area using the scanning laser.

One embodiment of a method of performing optics detection includes directing an interrogation beam toward a target area, receiving a reflection of the interrogation beam at a backscan mirror, controlling the backscan mirror to periodically hold an image of the reflection stationary, imaging the stationary image of the reflection with a receiver to provide a video image of the reflection, and processing the video image to determine whether the reflection contains a retro-reflection of the interrogation beam indicating presence of an optical system in the target area. With this method, advantages include any of improved deconfliction with other systems, improved search time, and improved performance.

Another embodiment of a method of performing optics detection during a search of a target area includes performing a wide area search of the target area using a scanning beam, and during the wide area search, directing an interrogation beam toward the target area, receiving a reflection of the interrogation beam at a backscan mirror, controlling the backscan mirror to periodically hold an image of the reflection stationary, imaging the stationary image of the reflection with a receiver to provide a video image of the reflection, and processing the video image to determine whether the reflection contains a retro-reflection of the interrogation beam indicating presence of an optical system in the target area. With this method, advantages include any of improved deconfliction with other systems, improved search time, and improved performance.

According to aspects of the method, the stationary image of the reflection is imaged with an infrared camera.

According to aspects of the method, the interrogation beam is generated with an infrared or near infrared laser.

According to aspects of the method, performing the wide area search includes panning a scanning beam over a range of azimuth degrees in a first direction.

According to aspects of the method, performing optics detection further comprises sharing a line of sight assembly to measure a range to an area of interest and to control a gimbal configured to move the interrogation beam and the scanning beam.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Existing optics detection systems are implemented as stand-alone systems, separately from fire control and situation awareness sensor systems. These stand-alone optics detection systems are often costly and take up valuable space, particularly in mobile installations such as vehicle-mounted systems, for example. As more and more capabilities in different systems are added to vehicles, particularly in military applications, these systems compete for space on the vehicle. In addition, the conventional approach of using individual, stand-alone systems makes rooftop deconfliction (the process of avoiding interference or hazards between systems on the host platform) more difficult. Multiple stand-alone systems also increase vehicle average unit production cost (AUPC) and the size-weight-and-power (SWaP) of the vehicle.

Figure 1:
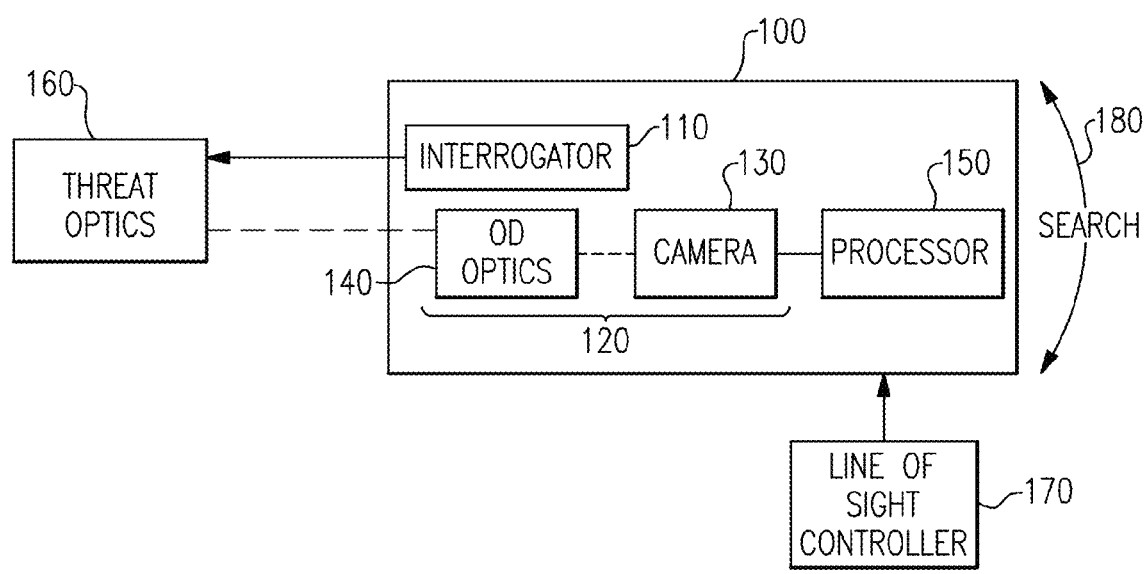
FIG. 1 is a block diagram of an optics detection system according to the related art.

Referring to FIG. 1, optical detection systems 100 based on retro-reflection use an optical mechanism (interrogator 110) that emits an optical beam, and optics 120, for example, a camera 130 and associated optics 140, that collect and create video of the reflected energy. This video is analyzed (using a processor 150) to detect a retro-reflected beam from threat optics 160. These systems typically include a line of sight control mechanism 170 that controls the orientation of the interrogator and OD optics/camera to determine the areas to be searched. Existing systems use a "step-stare search" approach in which the line-of sight or orientation of the optical mechanism is moved in steps between adjacent fields of view to search an area. The step-stare search method requires the line-of-sight of the optical mechanism to rapidly start, slew to the next field of view location, and stop, resulting in longer than necessary search time, higher than necessary system power, and reduced reliability of the of the optics control mechanism.

Thus, there is a need for an effective, low cost, small size mechanism for detecting direct view optical systems observing the host platform. Accordingly, aspects and embodiments are directed to a system that incorporates an optical detection subsystem within an electro-optical sighting system. In addition, the optical detection subsystem can also be, but need not be, configured to perform optics defeat processing during a wide area search or sector scan performed by the electro-optical sighting system. This approach allows for an improved vehicle rooftop or tower mounted system layout and improved rooftop or tower deconfliction, as well as reduced size, weight, power consumption, system cost and complexity, and provides improved installed performance, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring again to FIG. 1, in embodiment, the optics detection system 100 is configured to search X degrees in Y seconds at maximum range of Z meters for threat optical systems 160. The values of the parameters X, Y and Z may be set by specifications or for particular applications. To accomplish the search, the optics detection system 100 includes a monochromatic source (referred to as the interrogator 110), for example, a laser, that progressively illuminates the search area with an interrogator signal 102 as it is being moved through the range of X degrees, assuming the field of view of the interrogator is less than X degrees, as indicated by arrow 180. The threat optical system 160 retro-reflects energy 104 from the interrogator 110. The optics detection system 100 includes the receiver 120 that images the retro-reflection, and is configured with an optics detection processing method used to detect the threat optical system 160 from the images taken by the receiver. As discussed above, the receiver may include a camera 130 and associated optics 140. Thus, components of the optics detection system include the interrogator 110, receiver 120 and processor 150 configured to perform the optics detection processing method. Several of these components and capabilities are included within an electro-optic sighting system used to search for, identify and optionally target, threat systems in a search area. Accordingly, by integrating the optics detection system within an electro-optic sighting system, advantage may be taken of existing infrastructure to achieve a compact, high performance system with improved layout on the host platform, as discussed further below.

Figure 2:
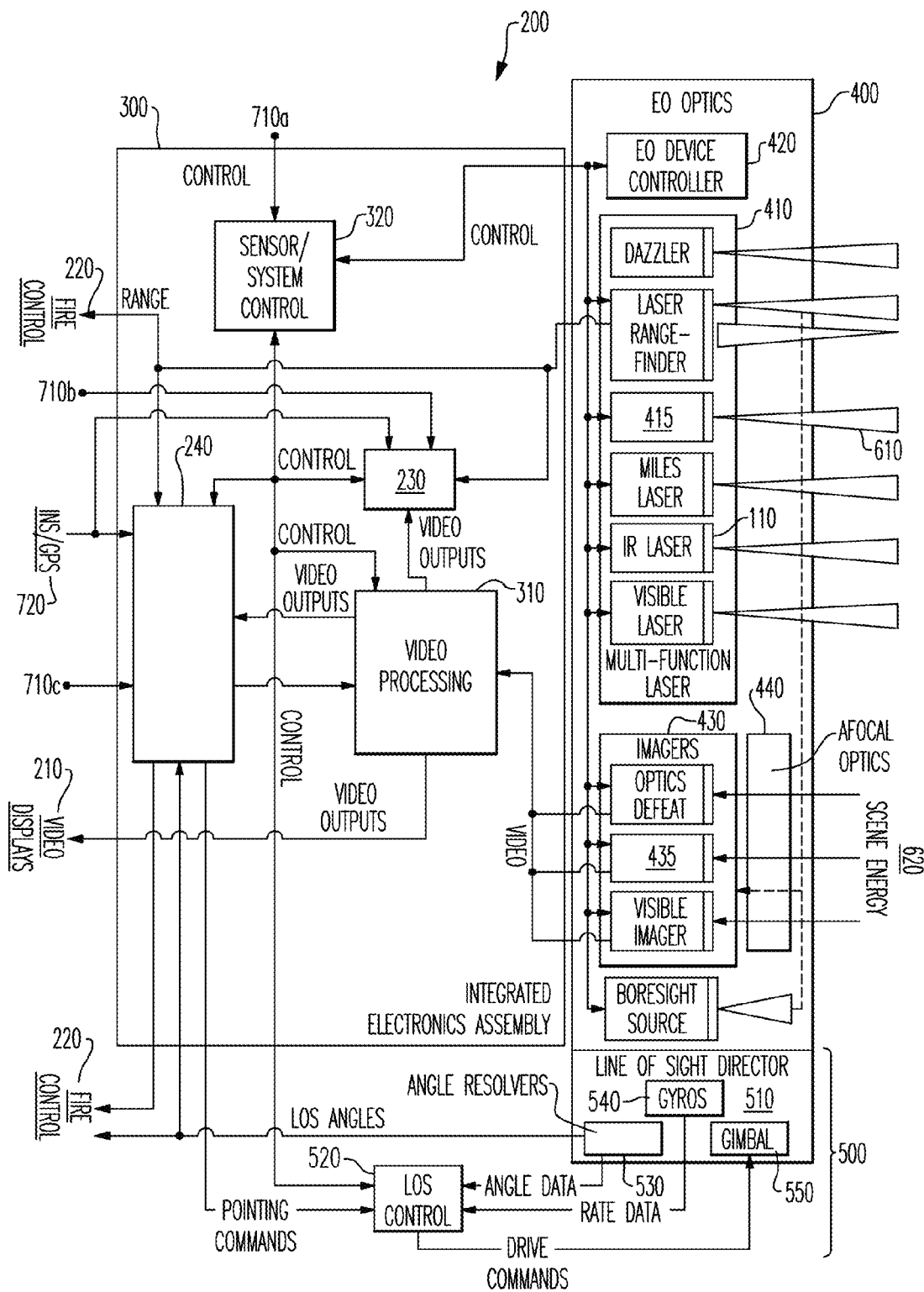
FIG. 2 is a simplified block diagram of one example of a sighting system including an integrated optics detection subsystem according to aspects of the invention.

Referring to FIG. 2 there is illustrated a simplified functional block diagram of one example of an electro-optical (EO) sighting system 200 including an integrated optics detect subsystem according to one embodiment. The EO sighting system 200 includes a sensor integrated electronics assembly 300, the EO optical assembly 400, and a line-of-sight control assembly 500 including a line-of-sight director 510 and line-of-sight controller 520. According to one embodiment, the optics detection interrogator 110 and receiver 120 are integrated with the EO optical assembly 400 of the sighting system. The EO optical assembly 400 may include a multi-function laser 410, EO device controller 420, imager subsystem 430, and afocal optics 440, as discussed further below. The multi-function laser 410 includes a plurality of lasers 415 that emit laser beams 610 used to interrogate a search area or "scene," and at least one of integrated optics detection interrogator source 110 that emits and interrogation beam. The imager subsystem 430 includes a plurality of imagers 435, for example, cameras that receive radiated energy 620, including reflected laser beams from the scene. An optics detection receiver 120 may be integrated with the imager subsystem to image a reflection of the interrogation beam, as further discussed below.

The integrated electronics assembly 300 of the sighting system 200 includes a video processor 310 coupled to the imager subsystem 430 and configured to process data obtained by the imagers 435. The video processor 310 may provide video outputs (for example, processed images or image data) to a video display 210 for viewing by a user, and to various other components of the sighting system 200. In one embodiment, the optics detection methods are implemented, at least in part, by the video processor 310, as discussed further below. The integrated electronics assembly 300 further includes a system controller 320 that provides control commands to the various subsystems in the sighting system 200, including, for example, the EO device controller 420, video processor 310 and line-of-sight controller 520. The sighting system 200 may include numerous other components to perform the various functions of the sighting system, represented schematically by block 230 and target tracking subsystem 240. These components may receive data and/or commands from the system controller 320, the video processor 310, each other, and/or external systems or devices 710a-c. For example, the target tracking subsystem 240 may receive location information from a GPS (global positioning system) unit or inertial navigation system 720 associated with the host platform. Similarly, at least some of these components may provide output data to external systems or devices and/or to users. For example, the target tracking subsystem 240 and/or EO optical assembly 400 may provide data (e.g., range to a detected target) to a fire control mechanism 220. These subsystems and/or components represented schematically by block 230 and the target tracking subsystem 240 may operate independently of the optics detection subsystem, and are therefore not discussed in detail. Furthermore, each of block 230 and target tracking subsystem 240 may include sub-components and may interact with other components of the sighting system 200 and/or external devices not illustrated in FIG. 2.

The sighting system 200 is configured to scan a scene using the EO optical assembly 400, process energy 620 from the scene (such as reflected laser beams) using the imager subsystem 430 and video processor 310, and to control components and provide outputs based on the processed image data, as illustrated schematically in FIG. 2. In addition, the sighting system includes the line-of-sight director 510 and line-of-sight controller 520 configured to move the EO optical assembly 400 to scan the scene. For example, the line-of-sight director 510 may include angle resolvers 530 and gyroscopes 540 configured to determine movement data for the EO optical assembly 400, for example, line-of-sight angle data and rate of movement data, that is provided to the line-of-sight controller 520. The line-of-sight controller 520 may use this data, together with commands received from the system controller 320 and/or tracking sub-system 240, to provide drive commands to a gimbal 550 configured to move the EO optical assembly 400. Thus, the sighting system 200 already has the capability to scan a target scene (including moving the scanning optics to sweep the scene) and to process energy from the scene. Particularly, in one embodiment, the sighting system is configured to perform a wide area search scan, a panning search, and/or a step and stare search. Accordingly, an integrated optics detection subsystem may take advantage of the existing infrastructure of the sighting system 200. For example, by integrating the optics detection hardware (interrogator 110 and receiver 120) into the sighting system, by sharing afocal optics 440, by sharing the line-of-sight director 510, as well as portions of the integrated electronics assembly 300 including the video processor 310, system controller 320, as well as the processing methods with the existing sighting system 200. It will be further appreciated that the afocal optics 440 may further comprise a backscan mirror 450 that can be shared by any or all of the interrogator 110, the receiver 120, and imagers 435, and that can be controlled by system controller 320, as will be further discussed below. With this arrangement, the optics detection function can be performed within the sighting system during a wide area search or panning search while meeting desired specifications for search timeline and search area.

As discussed above, according to one embodiment, the integrated optics detection subsystem includes an interrogator source 110 integrated with the multi-function laser 410 of the EO optical assembly 400. The multi-function laser 410 may include one or more types of laser sources 415 configured to generate a laser beam 610. Examples of laser sources that may be included in the multi-function laser 410, and which may be used for the interrogator 110, include an infrared laser (configured to emit a beam 610 having a wavelength in the infrared spectrum), a visible laser (configured to emit a beam 610 having a wavelength in the visible spectrum), a multiple integrated laser engagement system (MILES), a gas continuous wave laser generator (such as a Helium-Neon (HeNe) laser), a diode laser, or other suitable interrogator sources. In one example, the interrogator 110 includes a laser diode (or array of laser diodes) configured to provide a continuous wave laser having an output power of approximately 7 Watts (W) or more. Laser diodes provide an advantage of high output efficiency, for example, greater than about 40% at the diode output.

The interrogator beam 610 generated by the interrogator source 110 may have any suitable wavelength, for example, a wavelength in a range of approximately 800 nanometers (nm) to 1.1 micrometers (μm). In one example, the beam 610 emitted by the interrogator 110 must be in the spectral band of the interrogated optical system. Accordingly, the type of interrogator laser 110, and/or its emission wavelength, may be selected based on an expected type of threat optical system. For example, the interrogator 110 may include a MILES laser source having a beam wavelength in the range of about 900 nanometers (nm) to 1 μm. In another example, the interrogator is a laser diode having a beam wavelength in the 800 nm or 900 nm ranges. The interrogator beam 610 may have any suitable beam divergence. If the interrogator beam source's divergence is too narrow, for example a divergence in a range of less than 10 milliradians a beam expander may be used with the interrogator source 110 to increase the beam divergence and therefore the field of view of the interrogator. In one example, an anamorphic beam expander is used in conjunction with a laser diode source to increase the field of view of the interrogator 110. The interrogator laser source and beam expander thus has a fixed beam divergence and acts like a monochromatic "flashlight" illuminating a large area of the scene. The field of view may be limited by the output power of the interrogator source 110 and/or the spectral response of the receiver 120 required to achieve the required OD range. It is also to be appreciated that the different laser approaches can be consolidated into a multi-function laser 410 as illustrated in FIG. 2, but they do not have to be a part of a multi-function laser. Accordingly, according to at least one embodiment, every laser can be a separate laser.

The optics detection receiver 120 receives retro-reflected energy from threat optical systems 160 (See FIG. 1). The receiver 120 includes a camera 130, such as a charge coupled device (CCD) camera that may be integrated with the imager subsystem 430 of the EO optical assembly 400. The receiver 120 may be configured to detect any suitable wavelengths, such as, for example, infrared, visible, or ultraviolet wavelengths. In one embodiment, the camera 130 is a visual and near-infrared imager, including a color camera integrated with the imager subsystem 430. In another example, the camera 130 is a high-performance near-infrared imager. Referring to FIG. 1, the receiver optics 140 may include a spectral filter to limit the energy received by the camera 130 to select particular wavelengths corresponding to the wavelength(s) of the interrogator beam 610. Filtering the incoming scene energy 620 may significantly reduce background noise and improve the detection performance. Thus, according to aspects of the invention a filter in receiver optics 140 can limit energy transferred to Optic Detect Camera to just the interrogator wavelength for retro-reflection detection. The receiver 120 may be dedicated to the optics detection function, or alternatively may use a camera (such as a visual and near-infrared or infrared camera) that is shared for use with other imaging functions of the sighting system 200.

In one embodiment, the receiver field of view is approximately matched to the field of view of the interrogator 110. The size of the field of view of the receiver, and therefore the search rate (since a larger field of view allows faster searching), may be balanced with requirements for, or limits on, the system output power, as a larger field of view requires more output power to support optics detection at a required range. In one example, the camera 130 may have a field of view of approximately 20 degrees, or less. It is to be appreciated that alignment of the interrogator 110 with the receiver 120 is not critical; however, good alignment or overlap of the interrogator and receiver will improve performance to receive retro-reflections.

According to aspects of the system, the beam 610 emitted by the interrogator 110 may be modulated at, for example, approximately one-half the frame rate of the receiver 120 to be on for a period and off for a period. The modulation may allow the processor 150 to reject transient signals such as background noise or clutter that do not vary according to the transmitted modulation. In other words, the retro-reflection has to follow the transmitted signals. In addition, the integration time of the receiver 120 may be matched to the interrogator pulse width to minimize imaged background flux. For example, the interrogator may be configured to emit a pulsed laser beam, each pulse having a specified pulse width, which is synchronized to the receiver integration time. The pulse width may be selected to minimize blur in the images taken by the receiver, based on the size of the field of view and the rate of slew of the field of view across the X scanned degrees. For example, for a nominal 1 pixel blur, at a slew rate of 1 field-of-view per second, the pulse width of a beam generated by a laser diode interrogator may be approximately 1.56 ms.

As discussed above, the electro-optic sighting system 200 within which the optics detection subsystem is integrated may be configured for any of a wide area search mode, a panning search mode, or a step-stare search mode. Accordingly, the optics detection subsystem 100 may be configured to perform the optics detection functions within any of these search modes of the sighting system 200. In a step-stare search mode, the sighting system is configured to point the EO optical assembly 400 toward a designated search area, hold the EO optics in position for a designated time period (referred to as the "dwell time"), and then slew the EO optics by a designated amount, generally an angular distance equivalent to the field-of-view of the particular optical system (e.g., a selected one or more of the sources 415 of the multi-function laser 410) in use. The pointing and movement is achieved using the line-of-sight controller 520 and gimbal 550. In particular, Referring to FIG. 2, the illustrated integrated optics detection subsystem can be configured to perform the optics detection function during a step-stare search of the host sighting system 200. In a step-stare search mode, the line-of-sight controller 520 controls the gimbal 550 to start, stop and stare the EO optical assembly 400 over the range of azimuth degrees to search the target area, while the Optics Detect System illuminates area to search for threat optics. A typical stare time may be several video frame times during which any optics are detected, then the optics Detect System is moved to next search area. An exemplary illuminator beam divergence may be on the order of (~5°-~15°), and therefore the step and stare approach consists of accelerating a heavy gimbal (typically >100 lbs) assembly, decelerating the heavy gimbal assembly, and stabilizing the heavy gimbal assembly. Thus, it can be appreciated that the step time is relatively slow (a typical step time may be on the order of ≤0.25 seconds), and requires a lot of power. In the step stare approach, the starting, stopping and staring methodology is repeated until the entire field of search is covered. For optics detection in the step-stare search mode of the sighting system 200, the interrogator 110 and receiver 120 lines-of-sight are matched since the illumination and receiving of the reflected energy is performed while the optical apparatus is stationary (in the "stare" mode). As a result, image smear may be minimal. However, the step time, dictated at least in part by the rate at which the gimbal can be started, moved and stopped, limits the rate at which the search can be performed, and the step-stare method increases wear and tear on the line-of-sight controller 520.

Figure 3:
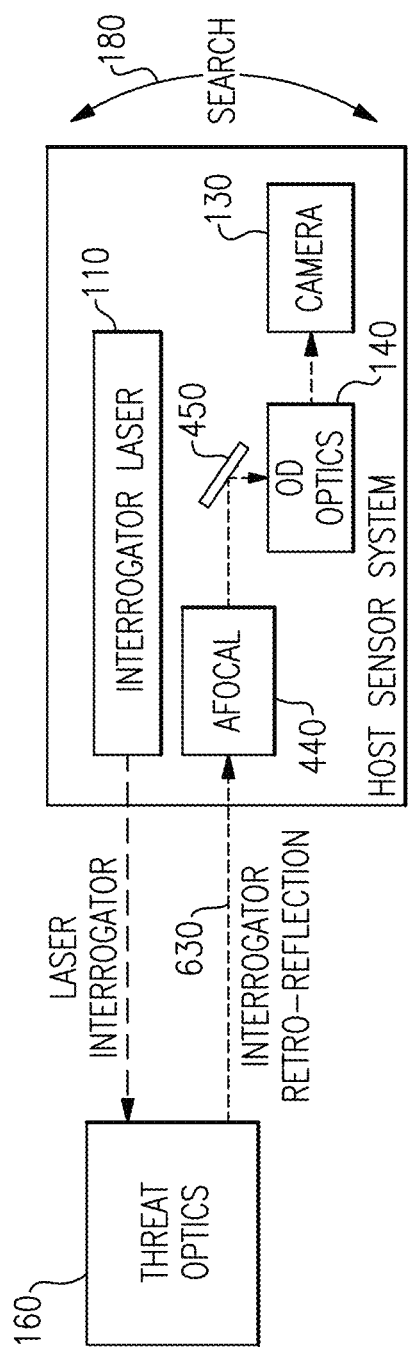
FIG. 3 is a block diagram of one example of an optics detection subsystem configuration according to aspects of the invention.

According to one embodiment, the optics detection subsystem, and the video processor 310 are configured to implement the optics detection function during a continuous wide area search of the sighting system 200, which has some advantages over the step-stare search method noted above. Referring to FIG. 3, the integrated optics detection subsystem is configured to perform the optics detection function during a wide area search of the host sighting system 200. In a wide area search mode, the line-of-sight controller 520 controls the gimbal 550 to continuously pan the EO optical assembly over the range of azimuth degrees to search the target area, with a goal being to search a large target area as quickly as possible. The speed of the wide area search may be selected based on the dwell time required by the imaging system of the host sighting system 200 to perform the wide area search. To implement an effective, simultaneous step-stare optics detection method within the wide area search mode of the host sighting system, the illustrated mirror 450 is a backscan mirror that is configured to hold an image of the reflection 630 stationary for a brief period such that it can be imaged by the receiver 120, as discussed further below.

Accordingly, as illustrated in FIG. 3, in one embodiment, the optics 140 and camera 130 of the integrated optics detection system are placed behind the backscan mirror 450 of the host EO optical assembly 400, as shown in FIG. 3. By stopping image motion (of the reflection 630) at the receiver 120 via the backscan mirror 450, the camera 130 may take a stationary (or almost stationary) image of the reflection 630, without the need to halt the gimbal assembly 550. Acceleration and deceleration of the gimbal assembly are not required. The gimbal assembly, and therefore the EO optical assembly 400 pans smoothly over the search area, while the backscan mirror 450 is configured to periodically stop the image of the reflection to allow the receiver 120 to perform as though a step-stare search were being implemented. This eliminates the need to stop and start the gimbal assembly 550. In one example, because the interrogator beam is not behind the backscan mirror it moves continuously and is swept across the area of the scene whose image is being held stationary at the OD receiver. Therefore the interrogate beam FOV needs to be larger than that of the OD receiver. Anamorphic optics (not shown), for example an anamorphic beam expander, are placed in front of the interrogator 110 to provide an enlarged, generally "oblong" shaped interrogator beam to illuminate the required area while minimizing the interrogator beam energy going to areas of the scene that will not be imaged by the OD receiver. Thus the interrogator beam is anamorphic with the horizontal beam divergence greater than the vertical width (i.e. ~2 horizontal FOVs). To achieve a stationary image of the reflection 630 at the receiver 120, the backscan mirror 450 is controlled to temporarily stop to capture the image of the reflection 630 to be sent to optics detect camera 130. After the temporary stationary period, or "dwell time," the backscan mirror 450 can be rapidly moved into position to begin the next cycle of obtaining the next image at the receiver 120 to be sent to optics detect camera 130. In other words, the gimbal 550 is moving at a fixed rate and the backscan mirror 450 is basically doing a step stare. Because the backscan mirror 450 is so small and requires so little power it can accelerate very quickly and "catch up" with the gimbal 550 to generate the next image. With this configuration, the stare time may be configured to several video frame times, so that the optics detection camera images a "frozen" image, and so that the optics detection algorithms can detect and report optics locations. The backscan mirror then rapidly rotates to move to and image the next FOV. According to aspects of this embodiment, a typical FOV may be in the range of 5° to 15°. The backscan mirror 450 has very low inertia and therefore can start, slew and stop much more quickly than the gimbal 550 with the mounted EO optical assembly 400. Thus, according to aspects of this embodiment, the step time can typically be on the order of <0.02 second (>10× faster than gimbal step). Accordingly, the above-discussed movement of the backscan mirror can be accomplished quickly and using far less power than would be required to start, slew and stop the gimbal 550. Thus, the optics detection search may be performed much more quickly and efficiently. In particular, the speed at which an area can be searched is improved when compared to conventional method, and the reliability and likelihood of detecting an optical system is improved, thus leading to improved survivability in a threatening environment.

Figure 4:
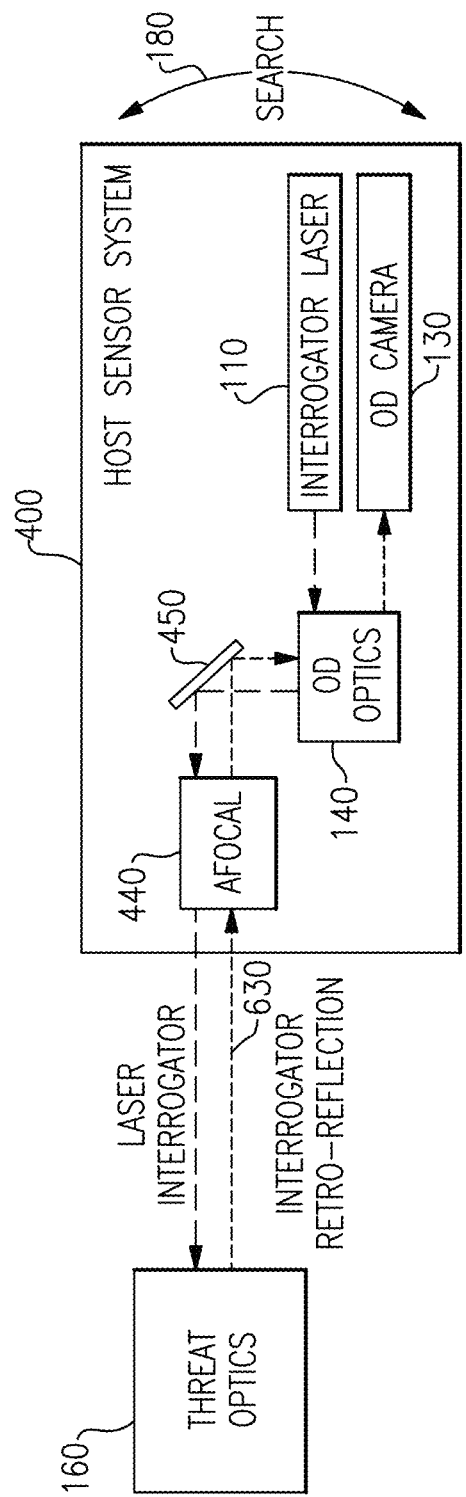
FIG. 4 is a block diagram of another embodiment of an optics detection subsystem configuration according to aspects of the invention.

Referring to FIG. 4 there is illustrated an alternative configuration of the integrated optics detection subsystem in which the interrogator 110 is also placed behind the backscan mirror 450. In this embodiment, the backscan mirror 450 rotates to freeze both the interrogator beam and the image sent to the optics 140 and camera 130, to counter the motion of line-of-sight controller 520 and assembly 400. In this embodiment, the lines-of-sight of the interrogator 110 and camera 150 are matched since both pass through the same optics (the optics 140, backscan mirror 450 and afocal optics 440). With this configuration, the stare time may also be configured to several video frame times, so that the optics detection camera images a "frozen" image, and so that the optics detection algorithms can detect and report optics locations. The backscan mirror then rapidly rotates to move to and image the next FOV. According to aspects of this embodiment, a typical FOV may also be in the range of 5° to 15°. An advantage of this embodiment also is that the backscan mirror 450 has very low inertia and therefore can start, slew and stop much more quickly than the gimbal 550 with the mounted EO optical assembly 400. Thus, according to aspects of this embodiment, the step time can also typically be on the order of <0.02 second (>10× faster than gimbal step). Accordingly, the above-discussed movement of the backscan mirror can be accomplished quickly and using far less power than would be required to start, slew and stop the gimbal 550. Thus, the optics detection search may be performed much more quickly and efficiently. With this embodiment, one or more beam splitters (not shown) may also be used to allow the interrogator 110 and receiver 120 to share the same optics (e.g., the backscan mirror 450 and afocal optics 440.

For both the configurations of FIG. 3 and FIG. 4, the speed of the optics detection search may be dictated by the dwell time necessary to reliably perform the optics detection processing, and/or the speed at which the host sighting system 200 performs the wide area search. In either case; however, the optics detection may be performed far more quickly and efficiently than a conventional step-stare method because the need to stop and start the gimbal 550 is eliminated, through the use of the backscan mirror 450, as discussed above. In one example, the dwell time for the optics detection processing is in a range of approximately 0.018 to 1.0 seconds. As noted above, with this arrangement it is an advantage to reduce power and step time.

As discussed above, the video processor 310 may be configured to receive video images or image data from the optics detection receiver 120, in addition to any video and/or data it receives from other components of the imager subsystem 430, and to perform optics detection processing method(s). A retro-reflected beam from threat optics 160 in the scanned area will have energy proportional to the threat optics' Optical Cross Section (OCS). The video processor 310 may be configured to detect the particular signature of a retro-reflected beam to detect threat optics in the scanned area. In particular, video processing algorithms that detect area(s) within video where retro reflections were present are the subject of commonly owned U.S. patent application Ser. No. 12/053,665 entitled "DETECTING A TARGET USING AN OPTICAL AUGMENTATION SENSOR.", which are herein incorporated by reference. If threat optics 160 are detected, in one embodiment, optics defeat actions, such as illuminating the scene with a dazzler laser source (see FIG. 2), may be taken. In such embodiment, the sighting system controller 320 may be programmed to control the sighting system 200 to take an optics defeat action.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An electro-optical (EO) sighting system, including an integrated optics detection (OD) sub-system, comprising:
   an EO optical module configured to scan and search a target area remote from the optical module, the EO optical module including:
      a multi-function laser configured to generate and emit at least one laser beam external to the optical module to search the target area;
      an imager sub-system configured to receive reflected laser radiation from the target area; and
      afocal optics coupled to the imager sub-system and configured to direct the reflected laser radiation to the imager sub-system, the afocal optics including a movable backscan mirror;
   a controller coupled to the EO optical module and configured to pan the EO optical module to sweep the at least one laser beam across the target area to perform a scan of the target area;
   a video processor coupled to the imager sub-system and configured to process data received from the imager subsystem and to provide video outputs representative of the scan of the target area; and
   the integrated OD sub-system configured to detect threat optics in the target area and including:
      an OD interrogator source integrated with the EO optical module and coupled to the backscan mirror, the OD interrogator source being configured to generate an interrogation beam, and the backscan mirror being configured to direct the interrogation beam into the target area; and
      an OD receiver integrated with the imager sub-system and coupled to the movable backscan mirror, the OD receiver being configured to receive and image a retro-reflection of the interrogation beam from the threat optics, and the movable backscan mirror being configured to direct the reflected electromagnetic radiation from the target area to the OD receiver;
   wherein the video processor is coupled to the OD receiver and further configured to receive and process image data from the OD receiver and to determine whether the image data includes an image of the retro-reflection of the interrogation beam indicating a presence of the threat optics within the target area; and
   wherein the controller is further configured to control the movable backscan mirror to periodically hold an image of at least a portion of the target area, including the retro-reflection, stationary on the OD receiver so as to allow the OD receiver to obtain a substantially stationary image of the retro-reflection without disrupting the scan of the target area performed by the EO optical module.

2. The electro-optical sighting system as claimed in claim 1, wherein the OD receiver includes a camera.

3. The electro-optical sighting system as claimed in claim 2, wherein the camera is an infrared or near infrared camera.

4. The electro-optical sighting system as claimed in claim 3, wherein the OD interrogator source includes an infrared or near infrared diode laser.

5. The electro-optical sighting system as claimed in claim 1, wherein the imager subsystem comprises a plurality of cameras.

6. The electro-optical sighting system as claimed in claim 1, wherein the multi-function laser includes the OD interrogator source.

7. The electro-optical sighting system as claimed in claim 1, wherein the OD receiver includes a filter configured to substantially limit the reflected electromagnetic radiation received by the OD receiver to electromagnetic radiation having a wavelength of the retro-reflection.

8. A method of performing optics detection to detect threat optics in a target area during a search of the target area remote from an electro-optical sighting system by the electro-optical sighting system, the method comprising:
   performing a wide area search of the target area using the electro-optical sighting system, including directing at least one laser beam into the target area, sweeping the at least one laser beam across the target area to perform a scan of the target area, and receiving and processing reflections of the at least one laser beam with an imager sub-system to produce an image of the target area;
   processing data output from the imager subsystem with a video processor coupled to the imager sub-system to provide video outputs representative of the scan of the target area;
   during the wide area search and without disrupting the wide area search, directing an interrogation beam external to the electro-optical sighting system toward the target area using a movable backscan mirror, the interrogation beam being separate from the at least one laser beam;
   receiving a reflection of the interrogation beam at the backscan mirror;
   controlling the backscan mirror to periodically hold an image of the reflection of the interrogation beam stationary on a receiver without disrupting the scan of the target area;
   imaging the stationary image of the reflection with the receiver to provide a video image of the reflection separate from the image of the target area produced by processing the reflections of the at least one laser beam; and
   processing the video image with the video processor to determine whether the reflection contains a retro-reflection of the interrogation beam indicating presence of the threat optics in the target area.

9. The method as claimed in claim 8, wherein imaging the stationary image of the reflection includes imaging the stationary image of the reflection using an infrared camera.

10. The method as claimed in claim 9, wherein directing the interrogation beam includes generating and emitting the interrogation beam using an infrared or near infrared laser.

11. The method as claimed in claim 8, wherein performing the wide area search includes panning a scanning beam over a range of azimuth degrees in a first direction.

12. An electro-optical sighting system, including an integrated optics detection (OD) sub-system, comprising:
   an optical module configured to search a target area remote from the optical module, the optical module including:
      a laser source configured to generate and emit a scanning beam;
      an OD interrogator source configured to generate and emit an interrogation beam external to the optical module, the interrogation beam being separate from the scanning beam;
      a receiver configured to image a reflection of the scanning beam; and
      an OD receiver configured to image a reflection of the interrogation beam;
   a controller coupled to the optical module and configured to move the electro-optical sighting system to pan the optical module across the target area to perform a scan of the target area;

a video processor coupled to the receiver and the OD receiver, the video processor being configured to receive an process first image data from the receiver and to provide video outputs representative of the scan of the target area, the video processor being further configured to receive and process second image data from the OD receiver to determine whether the second image data contains a retro-reflection of the interrogation beam indicating presence of an optical system in the target area; and a movable backscan mirror optically coupled to the receiver and to the OD receiver and configured to direct the reflection of the scanning bean to the receiver, to direct the reflection of the interrogation beam to the OD receiver and to periodically hold the reflection of the interrogation beam stationary on the OD receiver so as to allow the OD receiver to obtain a substantially stationary image of the reflection of the interrogation beam without disrupting the scan of the target area;

wherein the OD interrogator is coupled to the backscan mirror;

wherein the backscan mirror is further configured to direct the interrogation beam toward the target area; and wherein the optical module further comprises afocal optics optically coupled to the backscan mirror and configured to receive and direct the reflection of the scanning beam and the reflection of the interrogation beam to the backscan mirror.

13. The electro-optical sighting system as claimed in claim 12, wherein the OD receiver includes a camera.

14. The electro-optical sighting system as claimed in claim 13, wherein the camera is an infrared or near infrared camera.

15. The electro-optical sighting system as claimed in claim 14, wherein the OD interrogator includes an infrared or near infrared diode laser.

16. The electro-optical sighting system as claimed in claim 12, further comprising a line-of-sight director coupled to the controller, the line-of-sight director including at last one angle resolver and at least one gyroscope configured to determine movement data for the optical module and provide the movement data to the controller;

wherein the controller is configured to pan the optical module responsive to the movement data.

* * * * *